(12) United States Patent
Stevens et al.

(10) Patent No.: US 7,719,459 B2
(45) Date of Patent: May 18, 2010

(54) SECONDARY RADAR MESSAGE DECODING (75) Inventors: Martin Stevens, Harlow (GB); Quenton Jones, Harlow (GB)

(73) Assignee: Raytheon Systems Limited, Harlow (GB)

( * ) Notice: Subject to any disclaimer, the term of this patent is extended or adjusted under 35 U.S.C. 154(b) by 0 days.

(21) Appl. No.: 11/074,316

(22) Filed: Mar. 7, 2005

(65) Prior Publication Data

US 2006/0197700 A1  Sep. 7, 2006

(30) Foreign Application Priority Data

Mar. 8, 2004 (GB) ................. 0405175.1

(51) Int. Cl.
*G01S 13/00* (2006.01)
(52) U.S. Cl. ......................................... 342/37
(58) Field of Classification Search ................ 375/300, 375/324, 340; 342/30, 37
See application file for complete search history.

(56) References Cited

U.S. PATENT DOCUMENTS

| | | | |
|---|---|---|---|
| 4,316,190 A * | 2/1982 | Cole | 342/39 |
| 5,063,386 A | 11/1991 | Bourdeau et al. | |
| 5,089,822 A * | 2/1992 | Abaunza et al. | 342/30 |
| 5,387,915 A * | 2/1995 | Moussa et al. | 342/40 |
| 5,406,288 A * | 4/1995 | Billaud et al. | 342/37 |
| 5,455,586 A | 10/1995 | Barbier et al. | |
| 5,825,322 A | 10/1998 | Capozoli | |

(Continued)

FOREIGN PATENT DOCUMENTS

DE   24 19 885   10/1975

(Continued)

OTHER PUBLICATIONS

Wes Stamper, Understanding of Mode-S Technology, Defense Electronics/rfdesign.com, pp. 18-19.*

(Continued)

*Primary Examiner*—Thomas H Tarcza
*Assistant Examiner*—Harry Liu
(74) *Attorney, Agent, or Firm*—Daly, Crowley, Mofford & Durkee, LLP (57) ABSTRACT

A method and apparatus for determining a value of each bit in a secondary radar response pulse train sampled at a bit rate greater than one sample per bit is provided. The received signal is sampled repeatedly over a bit period. A scale factor for a weighting function is defined based on the amplitude levels detected from the response preamble. The weighting function has a maximum positive value at the expected bit amplitude for the first half of the bit period and decays to zero at higher amplitudes so that the effect of very large samples will be negligible. For lower amplitudes, the weighting decays to zero at the threshold level and becomes increasingly negative until zero amplitude. In the second half of the bit period the sign of the weighting function is swapped compared to the first half. The amplitude samples taken during the bit period are then each applied to the weighting function and the sum of the weighting function for the samples taken over the bit period is calculated. If the sum is positive, the bit is declared a "1"; if the sum is negative, the bit is declared a "0". The magnitude of the sum may be used as an indication of the quality of the bit decision.

20 Claims, 4 Drawing Sheets

U.S. PATENT DOCUMENTS

| | | | |
|---|---|---|---|
| 5,920,277 A * | 7/1999 | Foster et al. | 342/32 |
| 6,094,169 A | 7/2000 | Smith et al. | |
| 6,161,209 A * | 12/2000 | Moher | 714/780 |
| 6,172,970 B1 | 1/2001 | Ling et al. | |
| 6,792,058 B1 * | 9/2004 | Hershey et al. | 375/347 |
| 7,054,385 B2 * | 5/2006 | Booth et al. | 375/300 |
| 2003/0142002 A1 * | 7/2003 | Winner et al. | 342/36 |
| 2003/0146675 A1 * | 8/2003 | Cuhat et al. | 310/319 |
| 2003/0200490 A1 * | 10/2003 | Goudie | 714/704 |
| 2004/0233095 A1 * | 11/2004 | Galati et al. | 342/37 |
| 2005/0024256 A1 * | 2/2005 | Ridderheim et al. | 342/29 |
| 2005/0105657 A1 * | 5/2005 | Kroeger et al. | 375/347 |
| 2005/0156777 A1 * | 7/2005 | King et al. | 342/29 |
| 2005/0281318 A1 * | 12/2005 | Neugebauer | 375/134 |
| 2006/0077487 A1 * | 4/2006 | Bevans et al. | 358/504 |
| 2006/0197700 A1 | 9/2006 | Stevens et al. | |
| 2007/0103229 A1 * | 5/2007 | Billaud et al. | 329/313 |

FOREIGN PATENT DOCUMENTS

| | | |
|---|---|---|
| DE | 26 15 440 | 9/1977 |
| DE | 196 37 843 A1 | 3/1998 |
| EP | 0 521 750 A1 | 6/1992 |
| EP | 0521750 | 1/1993 |
| EP | 1 316 817 A3 | 6/2003 |
| GB | 1111701 | 5/1968 |
| GB | 1111701 A | 5/1968 |
| GB | 1401273 | 7/1975 |
| GB | 1 605 022 A | 12/1981 |
| GB | 1605022 | 12/1981 |
| GB | 1 605 167 | 9/1982 |
| GB | 1605167 | 9/1982 |
| JP | 60064280 A | 4/1985 |
| WO | WO 02/05454 A2 | 1/2002 |
| WO | WO 02/082121 A1 | 10/2002 |

OTHER PUBLICATIONS

PCT/GB2005/000865 International Search Report dated Jun. 6, 2005.

Minimum Operational Performance Standards for 1090 MHz Extended Squitter, Automatic Dependent Surveillance—Broadcast (ADS-B) and Traffic Information Services—Broadcast (TIS-B), 2003, vol. 1, pp. 1-777, RTCA, Inc., 1828 L. Street, NW, Suite 805, Washington, DC 20036-5133.

Minimum Operational Performance Standards for 1090 MHz Extended Squitter, Automatic Dependent Surveillance—Broadcast (ADS-B) and Traffic Information Services—Broadcast (TIS-B), 2003, vol. 2, pp. 1-349, RTCA, Inc., 1828 L. Street, NW, Suite 805, Washington, DC 20036-5133.

European Search Report for Application No. 09013883.5-2220/2146223, dated Jan. 21, 2010, 5 pages.

Alan Moore, David M. Salter, William K. Stafford, Mesar (Multi-Function, Electronically Scanned, Adaptive Radar), Radar 97, Oct. 1997, Publication No. 449, pp. 55-59.

Nobuyuki Kaku, Experiments on Supression of Differential Lobing Using an Integrated SLS Antenna, Electronics and Communications in Japan, Part I, Communications, Scripta Technica, New York, Jun. 1, 1991, vol. 74, No. 6, pp. 42-50.

Office Action Response dated Oct. 6, 2009 from European Patent Application No. 05717934.3. 2220.

Office Action Response dated Feb. 14, 2007 from United Kingdom Patent Application No. 0405175.1 from which present U.S. Application claims priority.

Office Action Response dated Dec. 17, 2007 from United Kingdom Patent Application No. 0702970.5.

Search report for Great Britain Application No. GB0405175.1, dated Aug. 3, 2004, 1 page.

Further search report for Great Britain Application No. GB0405175.1, dated Aug. 3, 2004, 2 pages.

Further search report for Great Britain Application No. GB0405175.1, dated Aug. 3, 2004, 1 page.

Search report for Great Britain Application No. GB0702970.5, dated Jun. 12, 2007, 1 page.

Combined search and examination report for Great Britain Application No. GB0702970.5, dated Jun. 13, 2007, 1 page.

EPO Office Action for Application No. 05 717 934.3, dated Oct. 28, 2009, 3 pages.

International Search Report and Written Opinion of the International Searching Authority for PCT/GB2005/000865, dated Jul. 20, 2005, 14 pages.

* cited by examiner

Figure 6a Garbled signal with strong and weak Mode S returns

Figure 6b Separated and decodable strong return

Figure 6c Separated and decodable weak return

SECONDARY RADAR MESSAGE DECODING

CROSS-REFERENCE TO RELATED APPLICATIONS

The present application claims the benefit of and priority to Great Britain Patent Application Number GB 0405175.1 filed on Mar. 8, 2004 which is hereby incorporated by reference.

BACKGROUND

The present invention relates to the field of secondary radar receivers. Secondary radar is used to obtain, from co-operating carrier vehicles equipped with transponders, coded information elements on the identity of the carrier and other information.

The transponders emit replies upon receipt of interrogation transmissions and may also spontaneously transmit in a mode of operation with selective addressing, called mode S operation. Secondary radar must therefore be provided with means enabling it to recognise those responses, among all the responses received, that are responses to its own interrogations, and having detected them, to decode and validate the code of the response.

As standardised by the International Civil Aviation Organisation (ICAO), a response in mode S is constituted by a train of pulses emitted on a carrier frequency of 1090 MHz, Each train of pulses comprises a preamble and a data block.

The preamble has four identical pulses with a nominal duration of 0.5 microseconds each. The first two pulses and the last two pulses are separated from each other by 0.5 microseconds. The first pulse and the third pulse are separated from each other by 3.5 microseconds.

The message or data block may be short or long. A short message message has 56 pulses of 0.5 microseconds each, and when it is long, it has 112. The modulation of the message is done by the position of the pulses that may be at the first or second half of 1 microsecond intervals. Some of the pulses merge and are then nominally one microsecond long, for example when a "01" code sequence occurs in the SSR response message. The first of these intervals begins 8 microseconds after the start of the preamble.

A secondary response is formed by a pulse train. Each pulse has a leading edge such that, in 50 nanoseconds, a power level representing 90% of the maximum level is reached. This pulse comprises a plateau corresponding to the power level and a decreasing edge. The time difference between the point of the leading edge and the point of the trailing edge having a power level equal to 50% of the maximum power of the pulse is 0.45 microseconds plus or minus 0.1 microseconds.

There is a surveillance technique, related to Mode S, which is known as ADS-B, where an aircraft may spontaneously transmit information such as position, that it has measured using satellite or other navigation means, coded into a set of Mode S messages.

It is expected that Mode S responses, spontaneous Mode S transmissions, surveillance modes such as ADS-B, and other uses of the 1090 MHz band will lead to a substantially increased number of messages in the future. There are currently no satisfactory mechanisms to ensure that only one message will be being received at any one time by the receiver. The term 'garbling' is used to refer to instances where more than one message is present at a receiver at anyone time. A garbled message is one where, during the time it is received, one or more other messages are present, coincident, or starting and stopping during the time period of the garbled message. Using conventional decoding methods, this will cause an increasingly high proportion of messages to be unreadable and limit the capacity of the system. This is because the decoding methods currently deployed are known have a limited ability to deal with the consequences of garbling.

The receiving processes employed for receiving the SSR signals are typically to receive the signal's 1090 MHz reply and to mix down to an intermediate frequency before envelope-detecting the signal, providing a voltage signal that represents the logarithm of the envelope amplitude versus time. Monopulse SSR radars also provide a signal that represents the angular deflection of a signal, relative to the centre of the main beam that indicates the direction of arrival, provided that there is only one signal being received. The noise bandwidth of the voltage channel is typically 8 MHz, and matched filtering techniques for reception are not commonly used.

Figure 1:
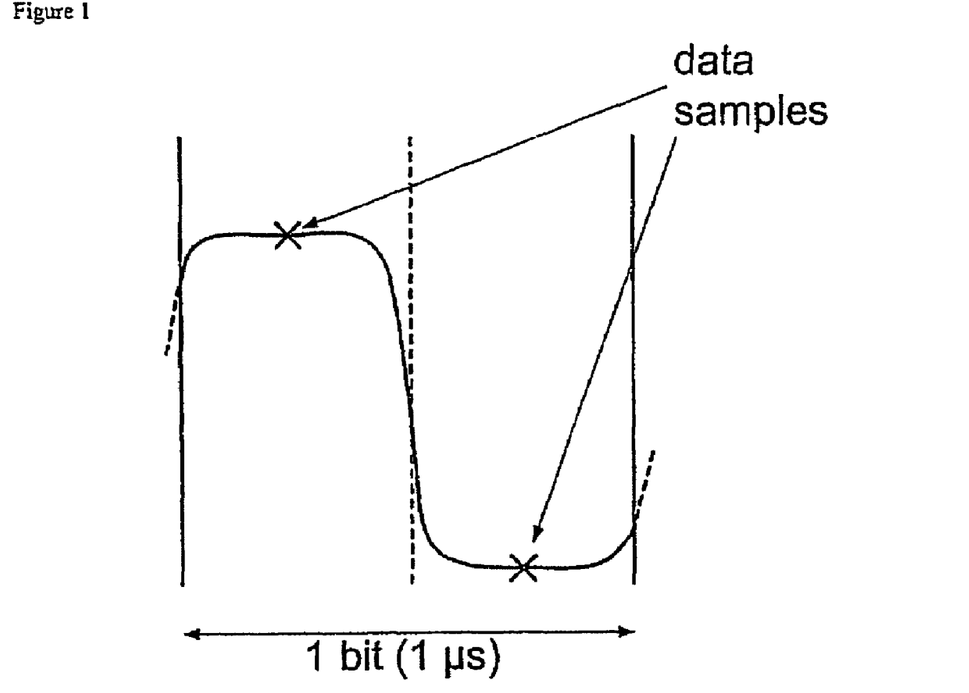
FIG. 1 illustrates a first prior art method.

In a well known technique for decoding Mode S signals, using the receiving processes as described above, the position of the preamble bits are detected and used to set a sampling position, two samples are made every bit period as shown for an example bit in FIG. 1. By comparing the magnitudes of the samples a decision can be made as to whether the bit is a 0 or a 1. A large ratio in magnitudes signifies a high probability of a correct decision. This method is susceptible to interference since garbling occurring at the time of sampling will often cause a wrong decision to be made. This method will not be suitable for Mode S with ADS-B except in very light traffic densities.

Figure 2:
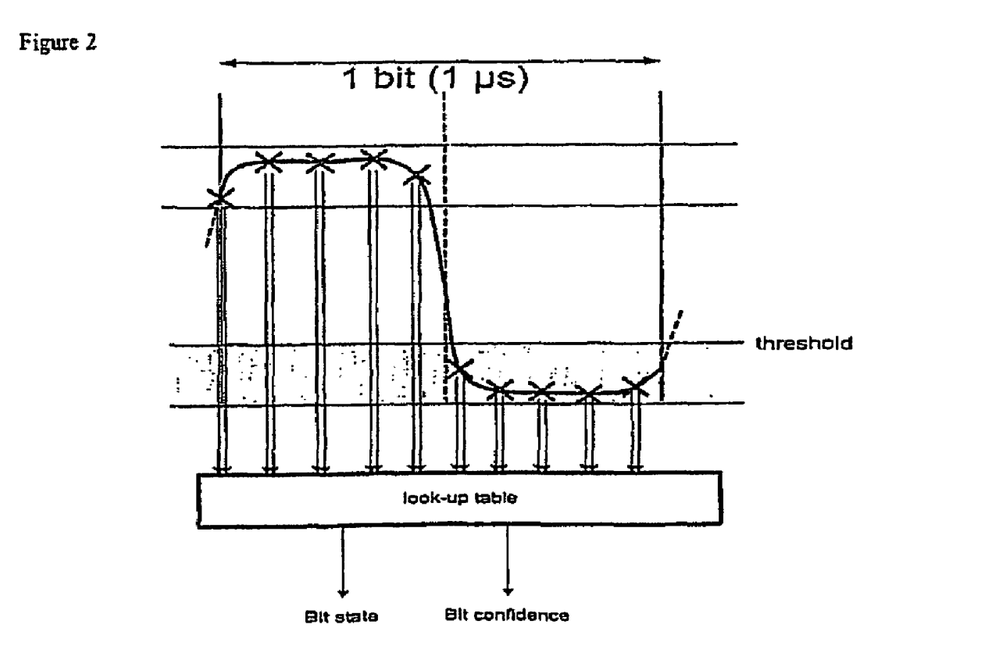
FIG. 2 illustrates a further prior art method.

A new algorithm in the public domain has been defined in order to improve the chances of decoding a signal in the presence of garbling, The algorithm is described in Minimum Operational Performance Standards for 1090 MHz Extended Squitter Automatic Dependent Surveillance-Broadcast (ADS-B) and Traffic Information Services-Broadcast (TIS-B), RTCA DO-260A, Appendix 1, RTCA Inc 2003. The principle of operation of this algorithm is shown in FIG. 2.

A higher sampling rate is employed than the common techniques, which generate 10 samples within the 1 microsecond bit period. The samples are categorised into one of 4 amplitude bands determined by analysis of the Mode S preamble, this is coded as 2 bits. From the 20 bits so formed a look-up table with 2 to the power 20 combinations is accessed to read the bit state and the bit confidence levels.

This technique is improved when compared with the original technique described in FIG. 1, because it uses more of the information in the signal with which to base its decision, and so a higher degree of garbling can be tolerated before bit errors are made. However it does not allow the separation of the required signal from the garbling signal.

Other known art is described in U.S. Pat. No. 6,094,169, which is a multi-lateration approach to measuring time differences from replies at multiple receive stations, U.S. Pat. No. 5,0633,86, which describes a method for multipath reduction and garbling reduction utilizing histogramming techniques, and U.S. Pat. No. 5,406,288 which describes a sampling and synchronisation method to reduce the probability of a garbled message.

In order to separate garbled signals, superresolution approaches have been suggested. WO02082121 describes the use of the slight frequency difference between the received carrier frequencies of garbled signals. This frequency difference is comprised of the errors in setting downlink carrier frequency, and also the Doppler shift of received signals. The downlink transmitter frequency reference source will typically be a crystal oscillator, and its accuracy will be in the order of one part in one million or worse The Doppler shift will be approximately in the range +/−1 kHz for civilian air traffic at 1090 MHz. The observation time for a single message of 120 microseconds will require very high signal to noise ratios for signals separated by one kilohertz or so, and in particular closely spaced aircraft in an airlane will tend to have highly similar Doppler shifts.

So it will be seen that previously known methods of decoding a 1090 MHz Mode S SSR transmission are limited to allowing a limited degree of decoding to be made in the presence of garbling, but not in general allowing the separation of signals.

SUMMARY OF THE INVENTION

In accordance with a first aspect of the invention, there is provided apparatus for and a method of decoding an SSR signal wherein a received signal is sampled repeatedly over a bit period and the sample values weighted according to a predetermined weighting function and summed to provide a decode value signal for that bit.

Preferably, the weighting function is such that the polarity of the decode value signal indicates the presence or absence of a digital signal pulse.

In a preferred embodiment the weighting function is such that the magnitude of the decode value signal provides a measure of the reliability of the indication of the presence or absence of a digital signal pulse provided by the decode signal value polarity.

In accordance with a further aspect of the invention there is provided a method of and apparatus for decoding SSR signals wherein a received signal comprising at least two signals garbled together is received at two or more antennas, the received signal from one antenna being combined with a phase-shifted received signal from one or more other antennas, the phase shift being chosen so as to suppress one of the two garbled signals so as to permit the other to be decoded.

In a further aspect, the invention provides a method and apparatus for decoding a received SSR signal comprising at least two signals garbled together wherein model fitting is utilised in order to separate garbled signals present in a single channel.

BRIEF DESCRIPTION OF THE DRAWINGS

Embodiments of the invention will now be described in detail, by way of example, with reference to the drawings, in which

FIGS. 6(*a*)-(*c*) illustrates the separation of garbled signals utilising the apparatus of FIGS. 4 and 5.

DESCRIPTION

According to one aspect of the present invention an improvement is provided which may be applied to a system with the receive processes described earlier, in particular in connection with FIG. 2 of the drawings. This method uses the bit amplitude levels ascertained from detecting the response preamble to define the scale factor for a weighting function.

Figure 3:
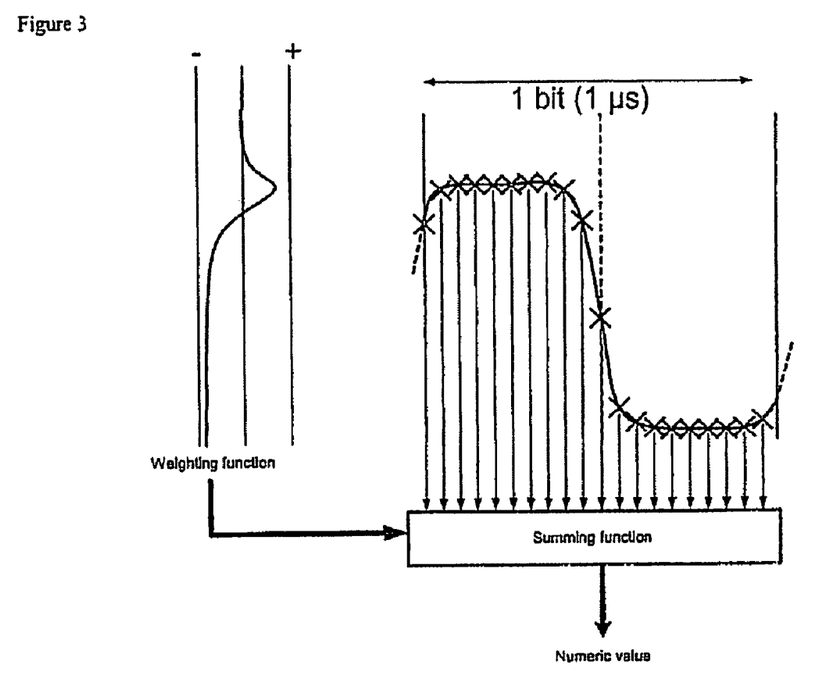
FIG. 3 illustrates a first improved method for decoding received SSR signals in accordance with the invention.

The amplitude samples that are taken during the bit period are then each applied to the weighting function and the sum of the weighting function for the samples taken over the bit period is calculated. This is illustrated in FIG. 3.

In the first half of the bit period, the weighting function has a maximum positive value at the expected bit amplitude. The weighting function decays to zero at higher amplitudes so that the effect of very large samples, obviously affected by interference, will be negligible. For lower amplitudes the weighting decays to 0 at the threshold level and becomes negative. The weight becomes increasingly negative until zero amplitude. In the second half of the bit period the sign of the weighting function is swapped compared with the first half, so that the weighting function has a maximum negative value at the expected bit amplitude increasing to zero at the threshold and becoming positive as the voltage from the detector decreases.

The sum of the weighting function for each bit period is taken and the bit is declared a "1" if the sum is positive, and it is declared a "0" if it is negative. The magnitude of the sum is an indication of the quality of the bit decision.

After the message has been decoded in this way, the checksum that is incorporated into the Mode S message may be evaluated, and if it is consistent with the message received, there is a high probability that the received message is correct. If the checksum is found to be incorrect, then the decoded bits that have the worst quality, and so have the highest likelihood of error, may be tested to see if by changing their state, a consistent checksum may be found. In this way simple controlled bit error correction may be made.

In a typical embodiment illustrated in FIG. 3, 20 samples are taken each bit period. Many different forms of the weighting function can be used.

The effect of forming the sum of the weighting functions for each sample is a non-linear integration that takes into account the probability distribution function of the sample values under the hypothesis either of a signal being present, or of a signal not being present. In general for the receive processes used in an envelope detector the amplitude probability distributions will be Rayleigh distributed in the case of no signal, in the presence of Gaussian distributed noise, and Rician in the case where a signal is present, If the signal of interest, as identified from the preamble is present, the probability distribution function will be known. The Rician probability distribution has two parameters, namely the amplitude of the signal, and the magnitude of the noise. In the case of garbling the probability distribution will be affected according to the phase and amplitude of the interfering signal. The total signal amplitude formed by the summation of the signal of interest and any garbling signal may be greater or less than the amplitude of the signal of interest alone. In general, the amplitude is more likely be higher and the probability distribution function will be skewed towards higher amplitudes, In the practical case, the actual distributions may not be Gaussian, and also the pulses will have finite rise times as described in the background section. The weighting function is preferably chosen to match the characteristics and the environment. The weighting function can, thus, provide a decoder which is matched to the amplitude distribution characteristics of the received signals, and so provides improved performance compared to the detectors described in the prior art.

The number of samples taken should preferably be as high as possible, however the limited IF signal bandwidth at the detector will provide a practical upper limit to the number that can usefully be utilised. There is no penalty for exceeding this; all that will happen is that the noise and signal levels on each successive sample will become more highly correlated, and thus provide no more information. According to the Nyquist criterion, well know to those skilled in the art, there will be no additional information in the sum by increasing the sample rate to be greater than twice the signal bandwidth.

According to another aspect of the invention the receiver processes are enhanced by adding one or more additional receivers and receive processors connected to antennas that have different phase centres. Preferably the phase centres should be separated so that aircraft separated by a small amount in azimuth have a significant path, and hence phase difference in each of the antennas, Typical embodiments would have a linear phased array of antenna elements, or a circular array of elements or any other spatial arrangement that would allow the received signals from a single aircraft to be distinctly separated in phase.

Figure 4:
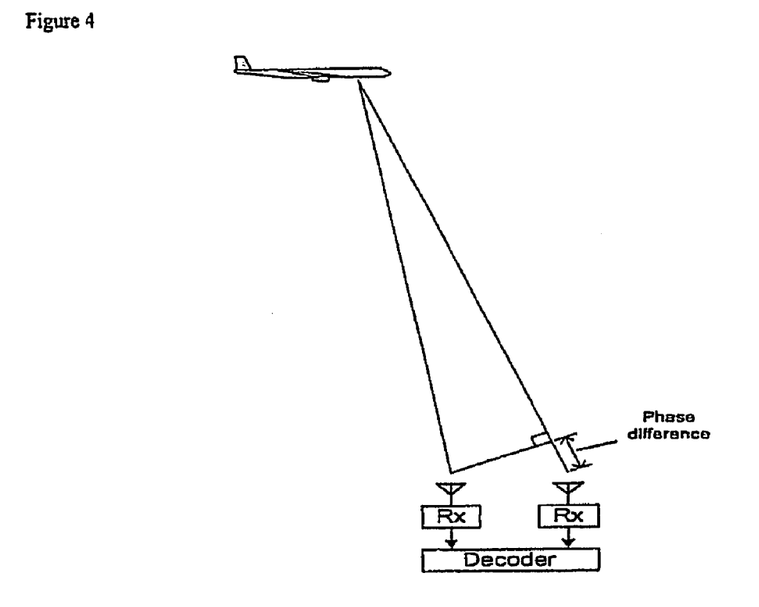
FIG. 4 shows apparatus for decoding garbled signals in accordance with a second aspect of the invention.
Figure 5:
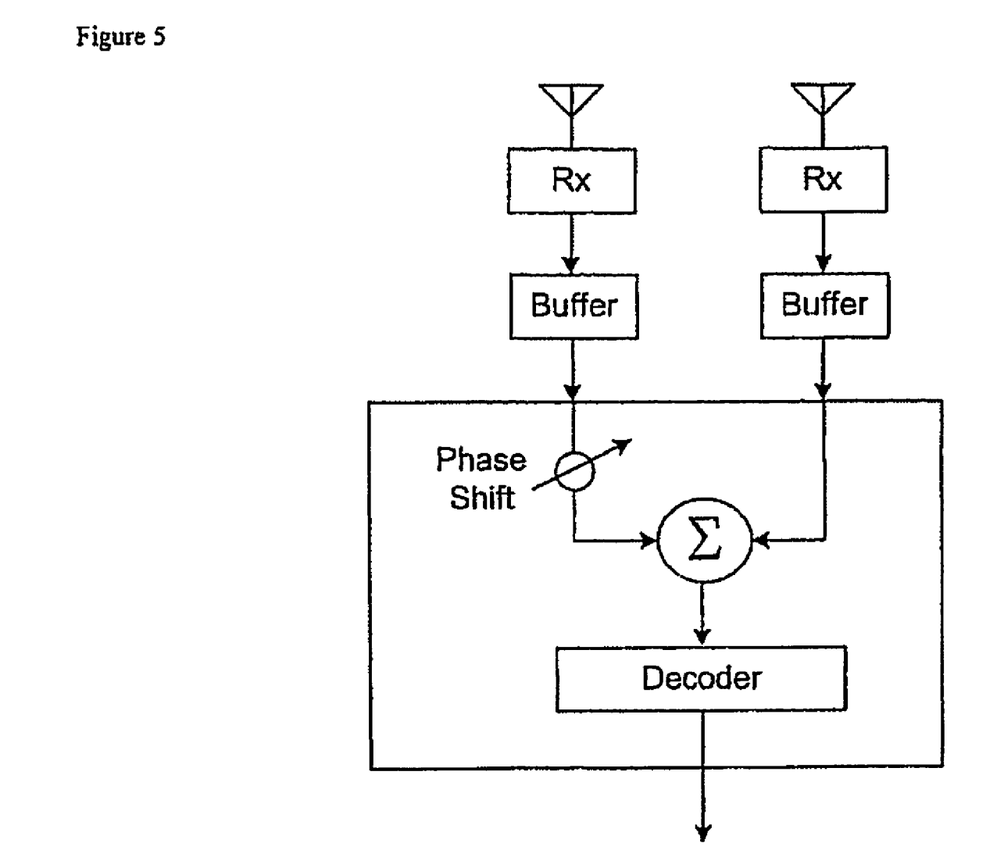
FIG. 5 is a schematic diagram showing the part of the apparatus of FIG. 4.
Figure 6A:
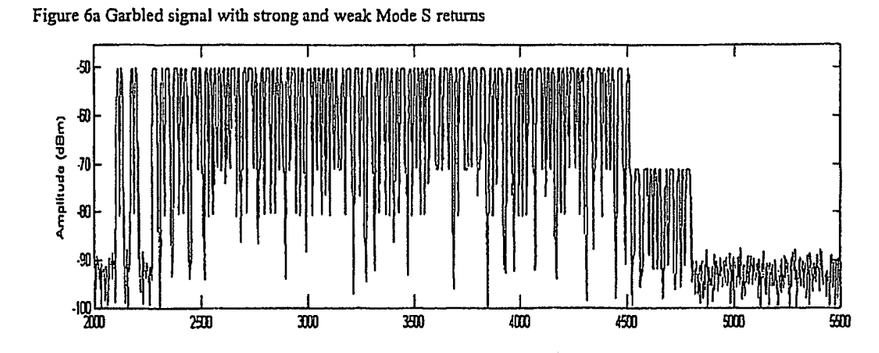
Figure 6B:
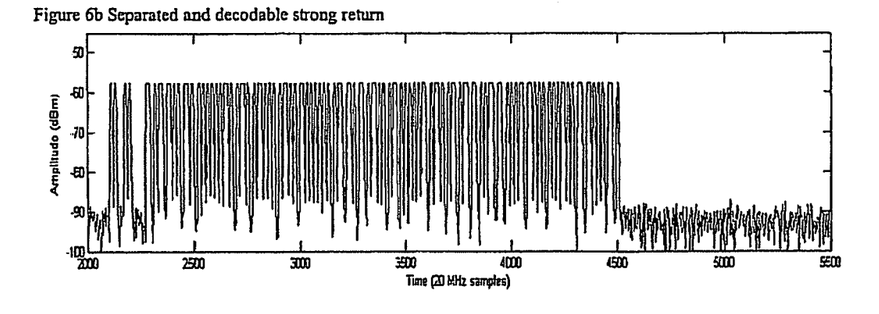
Figure 6C:
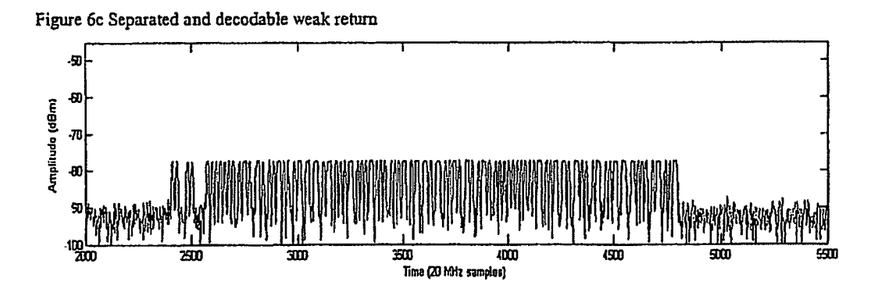

An embodiment of this aspect of the invention is where a single additional receive antenna and processing chain is illustrated in FIG. 4 which shows the different path length and hence phase difference that would occur when the signal from an aircraft is received at the antennas. FIG. 5 shows the processing arrangement. In this case the received signal processes are modified to provide for a combination of the received signal with a phase shifted version of the second receive signal. The phase shift is computed in order to provide destructive interference to cancel out the signal return from one aircraft. Illustrated in FIG. 6a are the signal returns from two Mode S SSR signals with garbling. By processing the signals first to eliminate the return from the second aircraft by selecting the phase of the combination the signal from the first aircraft can be obtained, this is shown in FIG. 6b. The process is then repeated to eliminate the return from the first aircraft by changing the phase shifter setting, the result is the signal shown in FIG. 6c. Both the signals in FIG. 6b and FIG. 6c can now be decoded using the techniques available in the prior art, or by using the methods described in this document.

Preferably the signals are sampled coherently at IF on each processing chain to provide the amplitude and phase information for the signals present which are then placed into a temporary buffer memory store. The complex signals can then be compared between channels in order to compute the cancellation weights. The process can be repeated using the stored signals to extract several garbled signals.

The weights can be calculated by using many of the well known constrained interference cancellation methods that are known in the art that place spatial nulls in the direction of the unwanted signal source so as to cancel its effects from the signal of interest. These methods include for example covariance matrix inversion or QR decomposition.

This aspect of the invention provides the advantage that it allows garbled and garbling signals to be recovered and so provides for a dramatic improvement in the capacity of the system.

An additional aspect of the invention is to provide a single receive chain, (or multiple receive chains accordance with the second aspect of the invention) with a coherent sampling to provide the amplitude and phase information for the signals present which are then placed into a temporary buffer memory store.

The complex signal envelope information is then processed to construct a parameterised model of the signal as a combination of several superimposed signals. The parameters of the model of each received message will include amplitude, phase, frequency, start time and the state of the information bits in the message. One or more messages may be represented in the model. Typically a least squares fit of the model to the measured signal will be made, varying the model parameters, until a minimum is found indicating the most likely value of the model parameters. This can be used to separate the signals and thus decode the information in the garbled messages. Typically the fit of the model to the measured data uses the criterion of the lowest least squares error. The least squares fit can be tried for 1, 2 3 or more messages represented by the model and the lowest error found can be used to declare how many garbled messages were found.

The method of solution may be an iterative gradient descent algorithm where the initial condition is determined by inspecting the signals and estimating the signal amplitudes, start times and phases. Alternative criteria can be used in solution such as minimum absolute deviation in order to reduce the effects of an impulsive non-Gaussian noise amplitude distribution.

These method employing the phase of the received signal allow the recovery of the constituent garbled messages.

The invention claimed is:

1. A method of decoding an SSR signal encoded using pulse position modulation, wherein a received SSR signal is sampled repeatedly over a bit period and the sample values weighted according to predetermined weighting function, the weighting function having a maximum positive value at an expected bit amplitude, decaying to zero for higher amplitudes, and decaying to a negative value for lower amplitudes for a first half of a bit period, and wherein a sign of the weighting function is swapped for a second half of the bit period, and summing the weighted values to a decode value signal for that bit; and outputting the decoded SSR signal.

2. The method of claim 1 wherein the weighting function is such that the polarity of the decode value signal indicates the presence or absence of a digital signal pulse.

3. The method of claim 2 wherein the weighting function is such that the magnitude of the decode value signal provides a measure of the reliability of the indication of the presence or absence of a digital signal pulse provided by the decode signal value polarity.

4. The method of claim 2 wherein the decode signal values for bits forming an SSR message are combined and checked against a checksum embedded within the message; the decode signal values being used in the event of a discrepancy to identify one or more bits with low reliability and correction to satisfy the checksum being attempted by changing the polarity of the or each such decode signal values.

5. The method according to claim 1 wherein the weighting function is dependent on a signal probability density function.

6. The method according to claim 1 in which the number of samples in each bit period is close to the maximum effective number determined by the Nyquist criterion so as to extract substantially full information therefrom.

7. A method according to claim 5 wherein the weighting function is dependent on the signal probability density function derived from measurements of the signal characteristics over a time period during which the signal is expected to have a known form.

8. A method according to claim 5 wherein the weighting function dependent on the signal probability density function derived from measurements of the signal characteristics over the time period of the preamble to the SSR message.

9. A method according to claim 1 wherein a received signal comprising at least two signals garbled together is received at two or more antennas, the received signal from one antenna being combined with a phase-shifted received signal from one or more other antennas, the phase shift being chosen so as to suppress one of the two garbled signals so as to permit the other to be decoded.

10. A method according to claim 1 wherein the received signal comprises at least two signals garbled together wherein model fitting is utilized in order to separate garbled signals present in a single channel.

11. Apparatus for decoding an SSR signal encoded using pulse position modulation comprising means for sampling a received SSR signal repeatedly over a bit period, means for weighting the sample values according to a predetermined weighting function, the weighting function having a maximum positive value at an expected bit amplitude, decaying to zero for higher amplitudes, and decaying to a negative value for lower amplitudes for a first half of a bit period, and wherein a sign of the weighting function is swapped for a second half of the bit period; means for summing the weighted sample values to provide a decode value signal for that bit; and means for outputting the decoded SSR signal.

12. Apparatus according to claim 11 wherein the weighting function is such that the polarity of the decode value signal indicates the presence or absence of a digital signal pulse.

13. Apparatus according to claim 12 wherein the weighting function is such that the magnitude of the decode value signal provides a measure of the reliability of the indication of the presence or absence of a digital signal pulse provided by the decode signal value polarity.

14. Apparatus according to claim 12 comprising means for combining the decode signal values for bits forming an SSR message and checking the result against a checksum embedded within the message; the means for utilizing the decode signal values in the event of a discrepancy to identify one or more bits with low reliability and to attempt correction to satisfy the checksum by changing the polarity of the or each such decode signal value.

15. Apparatus according to claim 11 wherein the weighting function is dependent on a signal probability density function.

16. Apparatus according to claim 15, wherein the weighting function is dependent on the signal probability density function derived from measurements of the signal characteristics over a time period during which the signal is expected to have a known form.

17. Apparatus according to claim 15, wherein the weighting function is dependent on the signal probability density function derived from the measurements of the signal characteristics over the time period of the preamble to the SSR message.

18. Apparatus according to claim 11 wherein the means for sampling the received signal is such that the number of samples in each bit period is close to the maximum effective number determined by the Nyquist criterion so as to extract substantially full information therefrom.

19. Apparatus according to claim 11 for decoding a received signal comprising at least two signals garbled together; the apparatus comprising two or more antennas at which the garbled signals are received, and the means for combining the received signal from one antenna with a phase-shifted received signal from one or more other antennas, the phase shift being chosen as to suppress one of the two garbled signals and permit the other to be decoded.

20. Apparatus according to claim 11 wherein the received signal comprises at least two signals garbled together and wherein model fitting is utilized in order to separate garbled signals present in a single channel.

* * * * *

UNITED STATES PATENT AND TRADEMARK OFFICE
CERTIFICATE OF CORRECTION

PATENT NO. : 7,719,459 B2  Page 1 of 1
APPLICATION NO. : 11/074316
DATED : May 18, 2010
INVENTOR(S) : Stevens et al.

It is certified that error appears in the above-identified patent and that said Letters Patent is hereby corrected as shown below:

Col. 1, line 27, delete "1090 MHz, Each" and replace with --1090 MHz. Each--.

Col. 1, line 35, delete "message message" and replace with --message--.

Col. 1, line 62, delete "will be being" and replace with --will be--.

Col. 2, line 32-35, delete "Minimum Operational Performance Standards for 1090 MHz Extended Squitter Automatic Dependent Surveillance-Broadcast (ADS-B) and Traffic Information Services-Broadcast (TIS-B)," and replace with --"Minimum Operational Performance Standards for 1090 MHz Extended Squitter Automatic Dependent Surveillance-Broadcast (ADS-B) and Traffic Information Services-Broadcast (TIS-B),"--.

Col. 2, line 54, delete "5,0633,86," and replace with --5,063,386,--.

Col. 3, line 54, delete "apparatus" and replace with --an apparatus--.

Col. 4, line 55, "be" and replace with --to be--.

Col. 5, line 6, "know" and replace with --known--.

Col. 5, line 15, "antennas," and replace with --antennas.--.

Col. 5, line 58, delete "accordance" and replace with --in accordance--.

Col. 6, line 19, delete "method" and replace with --methods--.

Signed and Sealed this

Sixteenth Day of November, 2010

David J. Kappos
*Director of the United States Patent and Trademark Office*